United States Patent [19]

Fukuzawa

[11] Patent Number: 5,600,514
[45] Date of Patent: Feb. 4, 1997

[54] MAGNETIC DISK DRIVE INCLUDING LABYRINTH SEAL AND MAGNETIC SEAL

[75] Inventor: Shinichi Fukuzawa, Kawasaki, Japan

[73] Assignee: Fujitsu Limited, Japan

[21] Appl. No.: 586,140

[22] Filed: Jan. 16, 1996

Related U.S. Application Data

[63] Continuation of Ser. No. 274,480, Jul. 13, 1994, abandoned.

[30] Foreign Application Priority Data

Sep. 24, 1993 [JP] Japan ................................. 5-237025

[51] Int. Cl.⁶ ................................................. G11B 17/02
[52] U.S. Cl. .......................................... 360/99.08; 360/98.07
[58] Field of Search ................... 360/99.08, 97.01–97.02, 360/98.07, 99.04

[56] References Cited

U.S. PATENT DOCUMENTS

| | | | |
|---|---|---|---|
| 4,535,373 | 8/1985 | Schuh | 360/97.03 |
| 4,890,174 | 12/1989 | Chalmers et al. | 360/78.12 |
| 4,922,406 | 5/1990 | Schuh | 360/97.03 |
| 5,132,856 | 7/1992 | Takahashi | 360/99.08 |
| 5,305,164 | 4/1994 | Elsing | 360/98.07 |

FOREIGN PATENT DOCUMENTS

| | | |
|---|---|---|
| 57-105863 | 7/1982 | Japan . |
| 57-167179 | 10/1982 | Japan . |
| 62-40683 | 2/1987 | Japan . |
| 1277374 | 11/1989 | Japan . |

Primary Examiner—John H. Wolff
Attorney, Agent, or Firm—Greer, Burns & Crain, Ltd.

[57] ABSTRACT

A magnetic disk drive capable of perfectly preventing dispersion of oil mists of a grease. The magnetic disk drive has a labyrinth seal disposed between a flange and a bushing of a spindle motor, thereby preventing a possible entry of oil mist of the grease applied to bearings into a sealed chamber. The magnetic disk drive further has a magnetic seal disposed between a rotor and a spindle shaft which are located axially opposite to the labyrinth seal relative to a stator. A combination of the labyrinth seal and the magnetic seal ensures improvement of the spindle motor while maintaining a sufficient sealing effect.

10 Claims, 8 Drawing Sheets

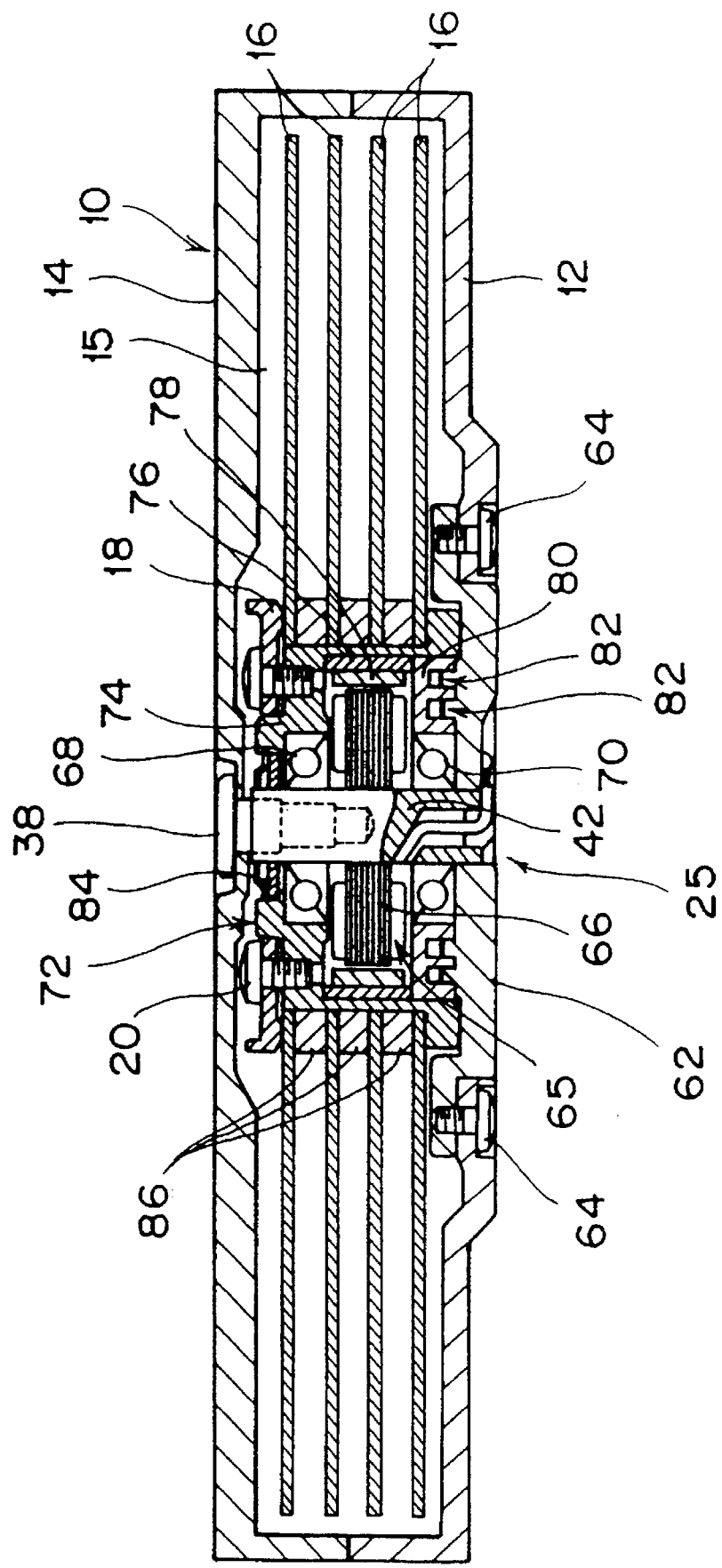

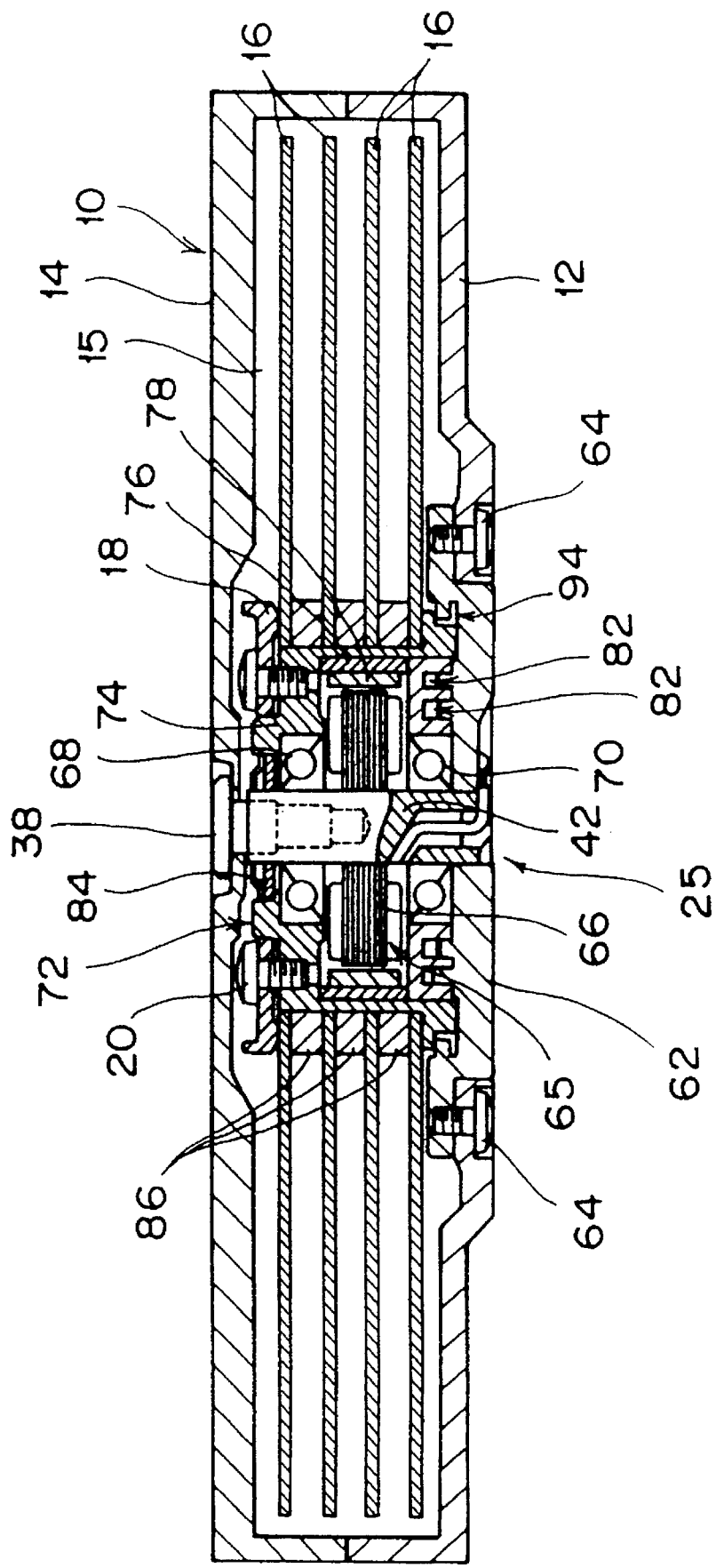

MAGNETIC DISK DRIVE INCLUDING LABYRINTH SEAL AND MAGNETIC SEAL

This application is a continuation of application Ser. No. 08/274,480 filed on Jul. 13, 1994, now abandoned.

BACKGROUND OF THE INVENTION

1. Field of the Invention

This invention relates generally to a magnetic disk drive and more particularly to a seal structure of a spindle motor for driving magnetic disks.

2. Description of the Related Art

Recently, a magnetic disk drive as one kind of external memories is made smaller and thinner. At the same time, a smaller electrical power consumption of is required. Also, improvement of recording density of the magnetic disk is demanded in order to fulfill the requirement of a larger capacity. This results in increase in the number of magnetic disks to be loaded on the magnetic disk drive. A computer disk drive generally employs a contact start stop (CSS) system for regulating a relation between a head and a magnetic disk. According to this system, the head floats above the magnetic disk during rotation of the magnetic disk, keeping a very small space between the head and the magnetic disk, the floating force caused by an air flow generated by high-speed rotation of the magnetic disk which is balanced with the force of a spring arm.

When the magnetic disk stops rotating, the head moves on the magnetic disk and contacts the disk at a contactable area thereof. During the time the magnetic disk stops rotating, the head is kept in contact with the magnetic disk. During rotation of the disk, since the head floats a very small distance above the magnetic disk, a head crash is liable to occur due to a existence of dust, etc. As means for preventing the head crash, the magnetic disks, as well as the magnetic heads for writing and reading data to and from the magnetic disks, are disposed in a sealed chamber defined within a disk enclosure (housing).

The magnetic disks are rotated by a spindle motor assembly. The spindle motor assembly includes a spindle shaft secured to the housing, and a spindle hub rotatably mounted on the spindle shaft through a pair of bearings. By inserting the magnetic disks and annular spacers alternately into the spindle hub and tightening a clamp to the spindle hub using screws, the magnetic disks are secured to the spindle hub with a predetermined space.

A stator having a coil is fixed to the spindle shaft, and a yoke, a permanent magnet and a bushing are fixed to the spindle hub, thereby constituting a rotor. The rotor is rotatably supported on the spindle shaft through a pair of bearings. In order to prevent dispersion of oil mist from grease applied to the bearings, a pair of magnetic seals are disposed on outer sides of the bearings.

In the spindle motor assembly thus constructed, since the pair of magnetic seals are axially spacedly provided on the spindle shaft in order to prevent dispersion of oil mist, it is difficult to obtain a sufficient axial dimension for accommodating stator and therefore, an amount of magnetic flux effective for rotating the rotor is inevitably decreased. As a result, it becomes difficult to reduce the motor's consumption of power.

Several magnetic disk drives, which employ labyrinth seals instead of magnetic seals, are disclosed in Japanese Laid-Open Patent Application Nos. Sho 57-105863, Sho 62-40683 and Hei 1-277374, and U.S. Pat. Nos. 4,535,373 and 4,922,406.

However, since those conventional magnetic disk drives have a pair of labyrinth seals axially spacedly provided on a spindle shaft between a stator portion and a rotor portion of a motor, the following problems are involved. Referring to a schematic view of FIG. 1, a spindle hub 4 is rotatably mounted on a spindle shaft 2 through a pair of bearings not shown. A labyrinth seal 5 is provided between the spindle hub 4 and a base 6. Another labyrinth seal 7 is provided between the spindle hub 4 and a cover 8.

The above arrangement, in which the pair of labyrinth seals 5 and 7 are axially spacedly provided, produces an air circulation as indicated by arrows A chiefly caused by difference in pressure and temperature within a disk enclosure. Once this air circulation occurs, oil mist of the grease tends to flow into a sealed chamber to cause a head crush, etc., no matter how precisely designed the labyrinth seals employed are.

SUMMARY OF THE INVENTION

It is therefore an object of the present invention to provide a magnetic disk drive capable of assuredly preventing dispersion of oil mist therefor grease, so that a head crash, etc. can be prevented from occurring.

Another object of the present invention is to provide a magnetic disk drive in which a sufficient height dimension of the wiring of a stator coil can be obtained in order to decrease a spindle motor's consumption of power.

In accordance with an aspect of the present invention, there is provided a magnetic disk drive comprising a housing having a base and a cover and defining a sealed chamber therein; at least one magnetic disk received for rotation in the sealed chamber; a flange fixed to the base; a spindle shaft fixed to the housing and the flange; a stator fixed to the spindle shaft; a rotor rotatably mounted on the spindle shaft, the rotor including a spindle hub and a permanent magnet and defining a gap between the permanent magnet and the stator, the permanent magnet being in opposite relation to the stator and forming a magnetic field therearound; bearing means for rotatably supporting the rotor about the spindle shaft; means for fixing the magnetic disk to the spindle hub; a labyrinth seal located between the bearing means and the sealed chamber and adapted to prevent entry of contaminated particles from the bearing means into the sealed chamber, the labyrinth seal being defined between the flange and an element to be rotated together with the rotor; and seal means capable of hydraulically contacting the spindle shaft for preventing the entry of contaminated particles from the bearing means into the sealed chamber, the seal means being disposed between the rotor and the spindle shaft which are located axially opposite to the labyrinth seal relative to the stator.

Preferably, the seal means is a magnetic seal comprising an annular magnet fixed to the rotor, a pair of magnetic plates sandwiching the annular magnet, and a magnetic fluid having magnetic particles dispersed therein.

According to the present invention, since only one labyrinth seal and only one seal means for sealing by hydraulic contact are provided as mentioned above, no axial air circulation will occur in the vicinity of the spindle shaft. Accordingly, the entry of oil mist into the sealed chamber via the labyrinth seal portion as heretofore experienced can be positively prevented. Moreover, since the labyrinth seal is employed on one side, an amount of magnetic flux generated by the stator coil can be increased compared with the conventional arrangement which employs a pair of magnetic seals, and therefore, the spindle motor's consumption of power can be reduced.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 8 is a cross-sectional view of another embodiment of the present invention; and FIG. 9 is a cross-sectional view of a further embodiment of the present invention.

DESCRIPTION OF THE PREFERRED EMBODIMENTS

Figure 1:
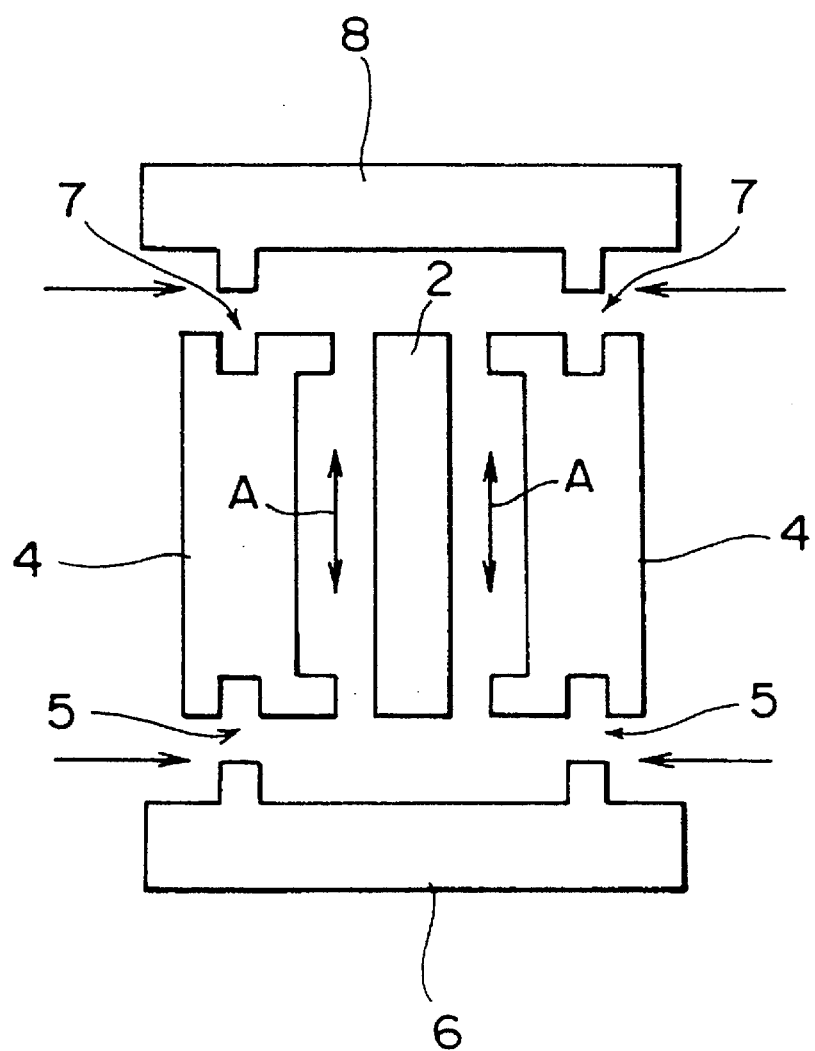
FIG. 1 is a schematic view showing a flow of air when two labyrinth seals are employed, one at an upper location and the other at a lower location.
Figure 2:
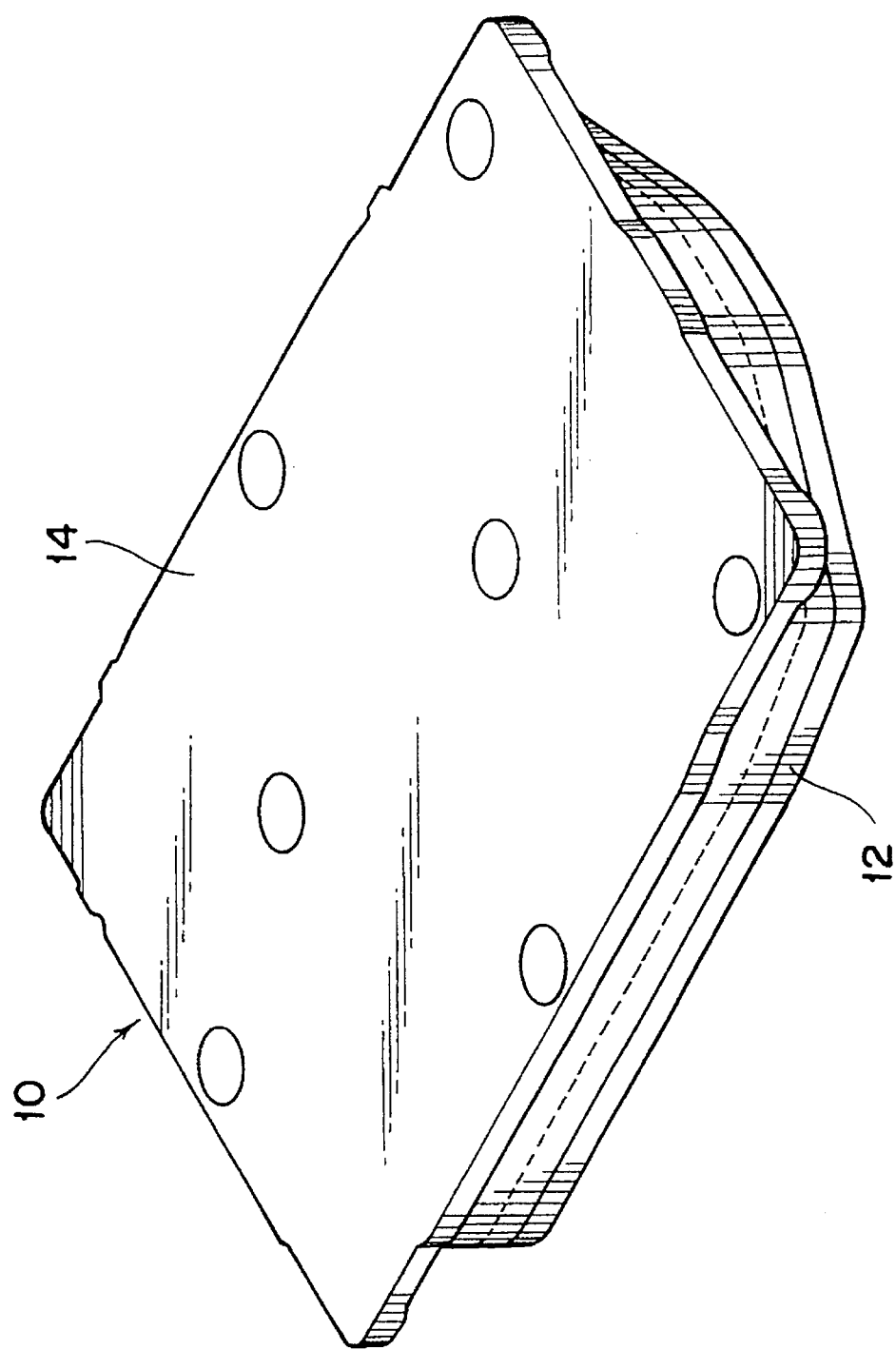
FIG. 2 is an outer perspective view of one embodiment of the present invention.
Figure 3:
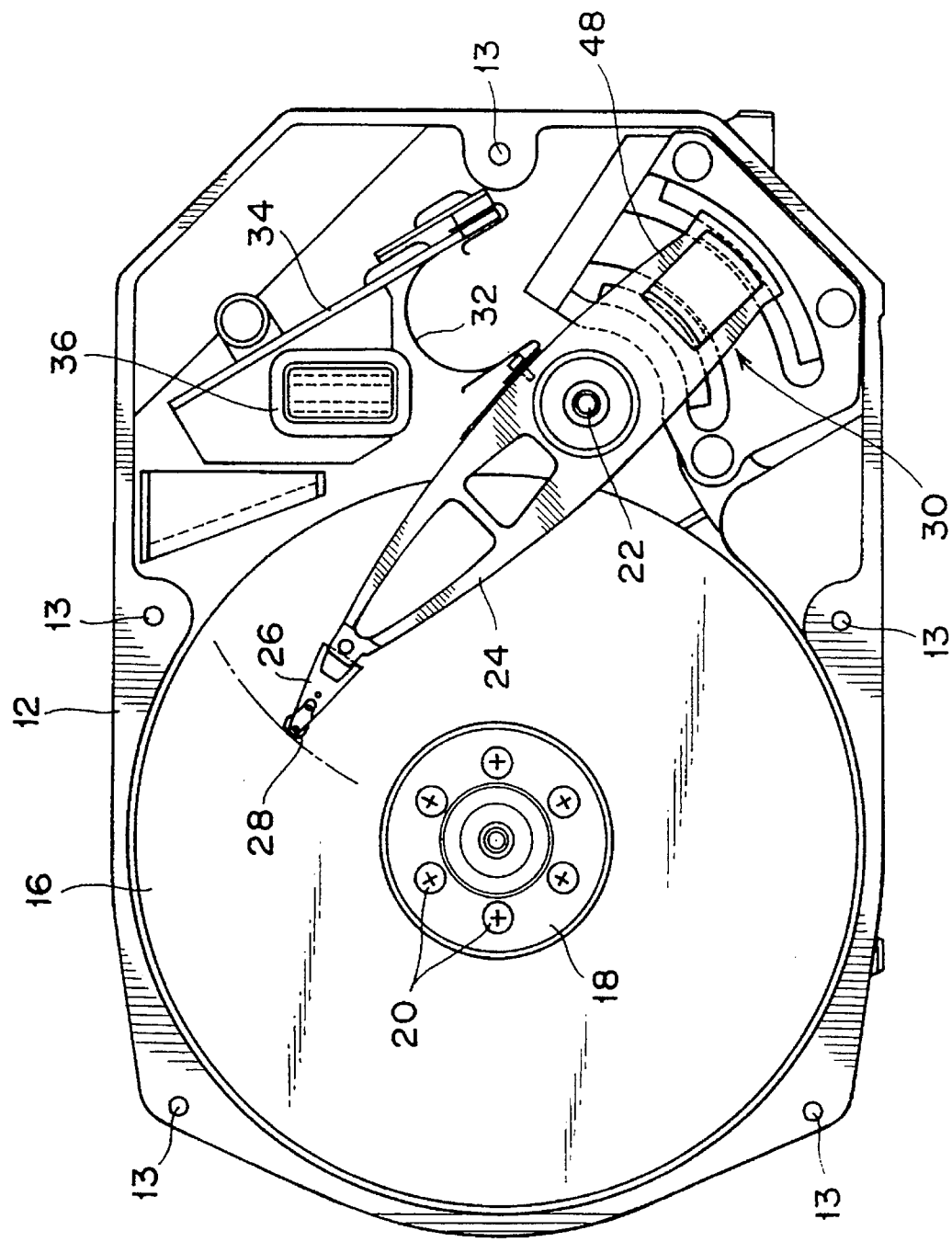
FIG. 3 is a plan view of the embodiment with a cover removed.

Embodiment of the present invention will be described in detail with reference to the accompanying drawings. FIG. 2 shows an outer perspective view of an embodiment of the present invention. A housing (disk enclosure) 10 comprises a base 12 and a cover 14. A sealed chamber 15 is defined in the housing 10. FIG. 3 shows a plan view of the embodiment in which the cover is removed. By tightening a clamp 18 to a spindle hub 74 shown in FIG. 5 using a plurality of screws 20, magnetic disks 16 are rotatably mounted on a spindle motor assembly 25.

A head arm 24 is rotatably mounted on a shaft 22. A spring arm 26 is fixed to one end of the head arm 24. A magnetic head 28 adapted to write/read data to and from the magnetic disks 16 is supported by a distal end portion of the spring arm 26. The other end of the head arm 24 is operatively connected to a voice coil motor 30. By supplying an electric current to a coil 48 of the voice coil motor 30, the head arm 24 is turned about the shaft 22.

Connected to the head arm 24 is one end of a flexible printed-wiring board 32 which is electrically connected to the magnetic head 28. The other end of the flexible printed-wiring board 32 is connected to a printed-wiring board 34 which is fixed to the base 12. A connector 36 is connected to the printed-wiring board 34. Owing to this arrangement, the data of the magnetic disk 16 read by the magnetic head 28 are brought outside of the magnetic disk drive through the flexible printed-wiring board 32, the printed-wiring board 34 and the connector 36.

Figure 4:
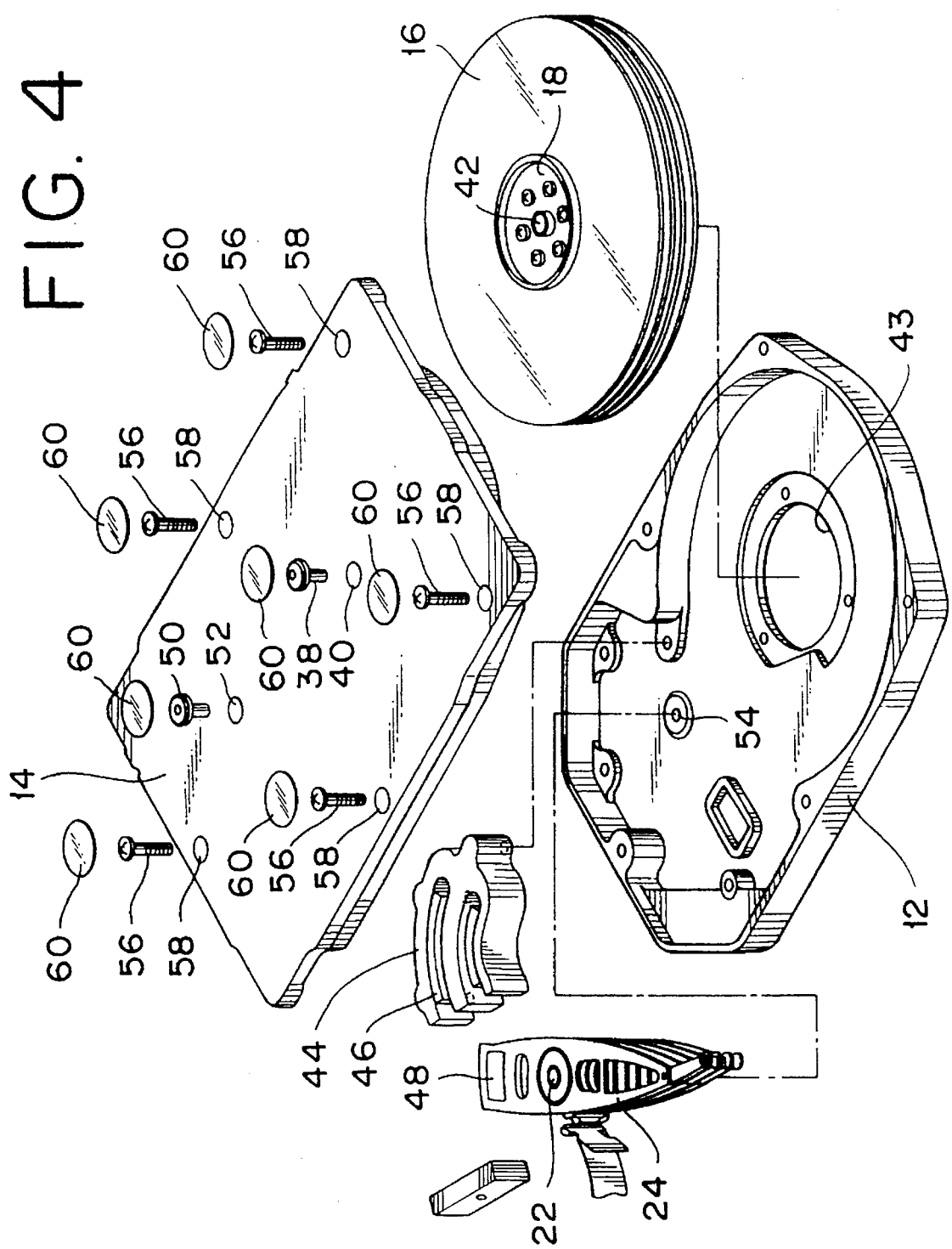
FIG. 4 is an exploded perspective view of the embodiment.
Figure 5:
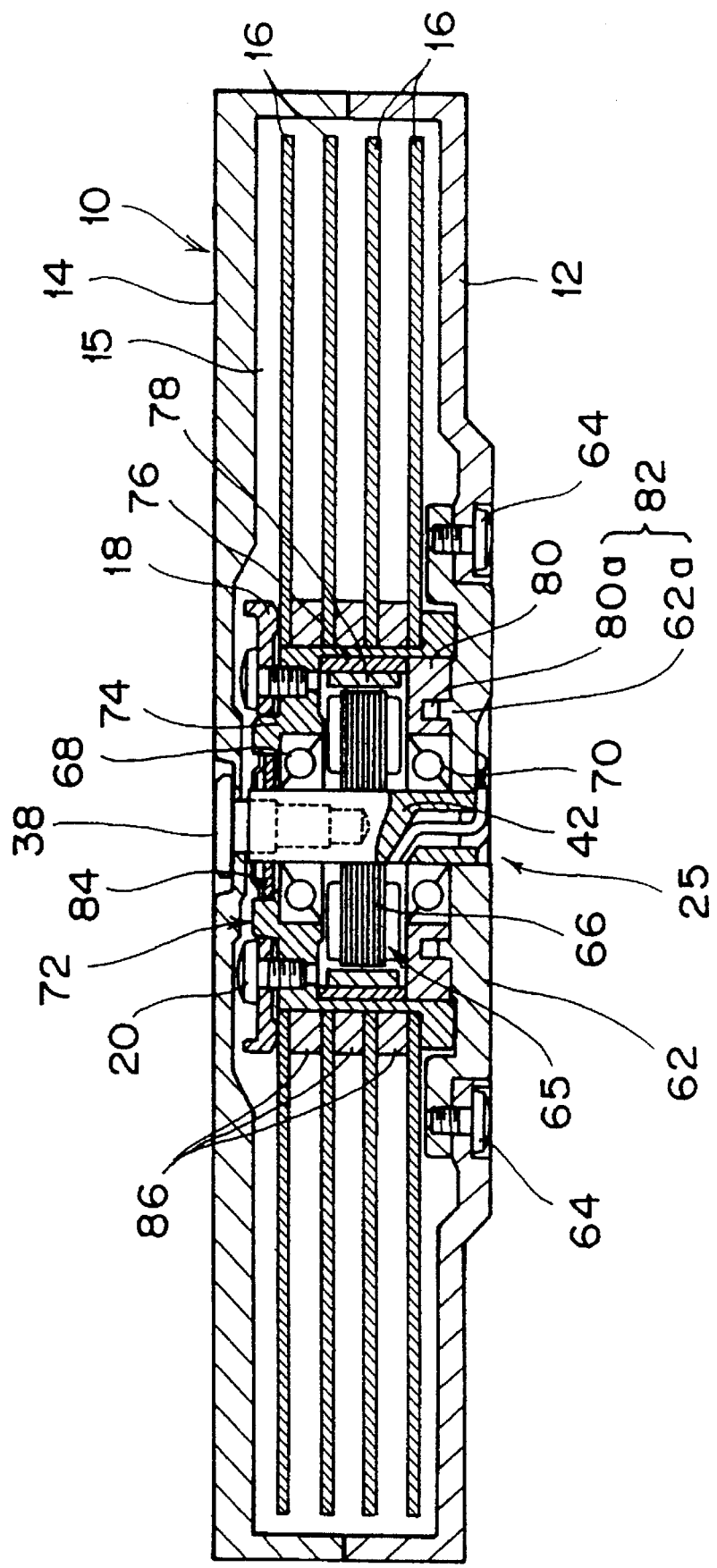
FIG. 5 is a cross-sectional view of the embodiment.

FIG. 4 shows an exploded perspective view of the embodiment, and FIG. 5 shows a cross-sectional view of the embodiment. A flange 62 of the spindle motor assembly 25 is partly inserted into a circular opening 43 formed in the base 12 and secured to the base 12 by screws 64. The spindle shaft 42 is fixedly press-fitted in the flange 62. A stator 65 having a coil 66 is fixedly bonded to the spindle shaft 42, and a rotor 72 is rotatably mounted on the spindle shaft 42 through a pair of bearings 68 and 70.

Inner races of the bearings 68 and 70 are fixedly press-fitted to the spindle shaft 42. An annular spindle hub 74 and an annular bushing 80 are fixedly bonded respectively to outer races of the bearings 68 and 70. An annular yoke 76 is bonded to an inner peripheral surface of the spindle hub 74, and an annular permanent magnet 78 is bonded to an inner peripheral surface of the annular yoke 76. A gap of a predetermined dimension is formed between the permanent magnet 78 and the stator 65. The permanent magnet 78 forms a magnetic circuit around the stator 65 in cooperation with the yoke 76.

An outer peripheral surface of the annular bushing 80 is bonded to the inner peripheral surface of the spindle hub 74. An annular groove 80a is formed in the annular bushing 80, and an annular projection 62a to be fitted into the annular groove 80a is integrally formed with the flange 62. The annular groove 80a and the annular projection 62a inserted in the annular groove 80a constitute a labyrinth seal 82 which prevents a possible entry of oil mist from the grease applied to the bearing 70 into the sealed chamber 15.

Figure 6:
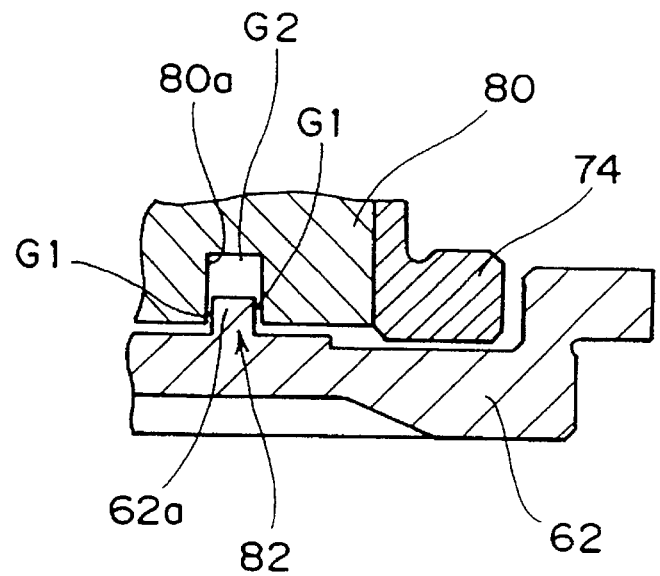
FIG. 6 is an enlarged sectional view of a labyrinth seal portion.

Referring to FIG. 6, an enlarged sectional view of the labyrinth seal 82 portion is illustrated. A radial gap G1 of the labyrinth seal 82 is preferably as narrower (i.e., smaller) as possible. Actually, a radial gap G1 of about 1 mm or less, which is determined by machining accuracy, is employed. On the other hand, an axial gap G2 is required to have a somewhat wide dimension (several mm in actual practice), so that an air stagnating portion is formed.

Figure 7:
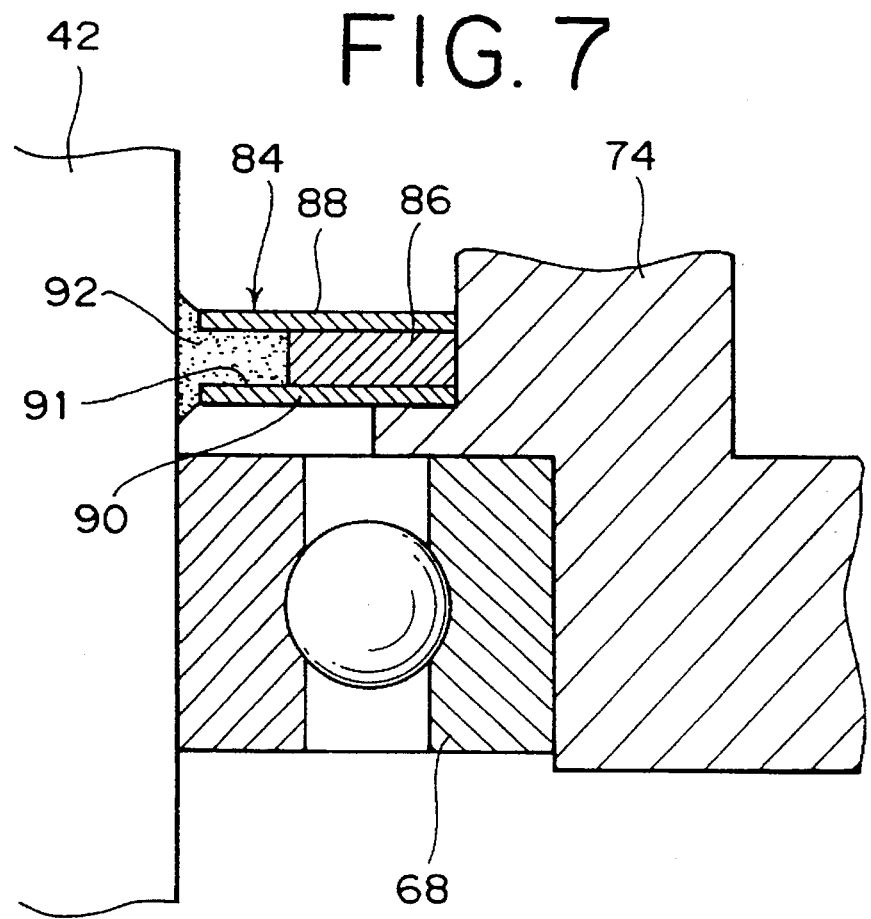
FIG. 7 is an enlarged sectional view of a magnetic seal portion.

Referring back to FIG. 5, a magnetic seal 84 is provided between that portion of the spindle shaft 42 and that portion of the spindle hub 74 which are located on an upper side of the bearing 68. This magnetic seal 84 is adapted to prevent a possible entry of oil mist from the grease applied to the bearing 68 into the sealed chamber 15. Referring to FIG. 7, an enlarged sectional view of the magnetic seal 84 portion is illustrated. The magnetic seal 84 includes an annular magnet 86 bonded to the spindle hub 74, and a pair of annular magnetic plates 88 bonded to the spindle hub 74 in such a manner as to sandwich the annular magnet 86.

Inner peripheral sides of the annular magnetic plates 88 are allowed to extend toward the spindle shaft 42 exceeding inner peripheral surface of the annular magnet 86. An annular cavity 91 is defined by the annular magnet 86, the annular magnetic plates 88 and the spindle shaft 42. When a magnetic fluid 92 having magnetic particles dispersed therein is charged into the annular cavity 91, the magnetic fluid 94 is held in contact with the spindle shaft 42, thereby sealing the bearing 68.

Referring back to FIG. 5, by inserting the magnetic disks 16 and annular spacers 86 alternately into the spindle hub 74 and tightening a clamp 18 to the spindle hub 74 using screws 20, the magnetic disks 16 (four magnetic disks are employed in this embodiment) are fixed to the spindle hub 74 with a predetermined space. As shown in FIG. 4, by tightening a screw 38 to the spindle shaft 42 through a hole 40 formed in the cover 14, an upper end portion of the spindle shaft 42 is fixed to the housing 10.

In FIG. 4, reference numeral 44 denotes a yoke with a permanent magnet 46 bonded thereto. The yoke 44 is to be fixed to the base 12 by screws. The shaft 22 having the head arm 24 rotatably mounted thereon is firmly secured to the base 12 by a screw through a hole 54 formed in the base 12. By tightening a screw 50 through a hole 52 formed in the cover 14, an upper end portion of the shaft 22 is fixed relative to the cover 14.

After the completion of assembly of the component elements performed in the manner as mentioned above, screws 56 are tightly screwed into threaded holes 13 formed in the base 12 through five holes 58 formed in the cover 14 so that the cover 14 is fixed relative to the base 12. The housing 10 can be perfectly sealed by applying a seal 60 to top of each of the screws 38, 50 and 56.

As described above in detail, according to this embodiment, since the spaces between the bearings 68 and 70 and the sealed chambers 15 are sealed by only one magnetic seal 84 and only one labyrinth seal 82, a height dimension of the wiring of the coil 66 of the stator 65 can be increased compared with the prior art which employs a pair of magnetic seals. As a result, the motor's consumption of power can be reduced, thus enabling to enhance the characteristics of the motor. Moreover, since magnetic seals, which are expensive, can be omitted by one, costs of the magnetic disk drive can be reduced to that extent.

Furthermore, since only one labyrinth seal 82 is provided between the flange 62 and the bushing 80 of the rotor 72 and only one magnetic seal 84 is provided between an axially upper portion of the spindle shaft 42 and the spindle hub 74, no air circulation will occur in the vicinity of the spindle shaft 42. Accordingly, oil mist from the grease applied to the bearings 68 and 70 can be perfectly sealed by a combination of the labyrinth seal 82 and the magnetic seal 84, thus preventing a possible entry of the oil mist into the sealed chamber 15. Since the flange 62 and the bushing 80 are assembled at the time when the spindle motor assembly 25 is made, the radial gap G1 of the labyrinth seal 82 can be managed with ease. Therefore, this embodiment is suitable for mass production.

Since the radial gap G1 of the labyrinth seal 82 is formed narrow and the axial gap G2 thereof is formed comparatively wide, the flow rate is increased at the radial gap G1 portion. This makes it difficult for the oil mist to enter the sealed chamber 15. On the other hand, since the flow rate is decreased at the axial gap G2 portion having a large dimension, air tends to stagnate there. At this air stagnating spot, oil mist is caught and prevented from flowing outside.

Referring now to FIG. 8, a cross-sectional view of another embodiment of the present invention is illustrated. In this embodiment, two labyrinth seals 82 are formed between the flange 62 and the bushing 80. Since the remaining construction is the same to the embodiment of FIG. 5, like parts are denoted by like reference numerals and description thereof is omitted. Also in this embodiment, a combination of the labyrinth seals 82 and the magnetic seal 84 is employed, a similar effect as in the above-mentioned embodiment can be obtained.

Referring finally to FIG. 9, a cross-sectional view of a further embodiment of the present invention is illustrated. In this embodiment, a second labyrinth seal 94 is formed between the flange 62 and the spindle hub 74. Since the labyrinth seals are of two-stage structure, sealing effect can be increased. Since the remaining construction of this embodiment is the same to the embodiment of FIG. 5, like parts are denoted by like reference numerals and description thereof is omitted. Also in this embodiment, a combination of the labyrinth seals 82 and 94 and the magnetic seal 84 is employed, a similar effect as in the above-mentioned embodiment of FIG. 5 can be obtained.

Since the present invention is constructed in the manner as described above in detail, oil mist from the grease applied to the bearings of the motor can be perfectly prevented from entering into the sealed chamber and therefore, a head crash of the magnetic head, etc. caused by the oil mist, etc. can be effectively prevented. Furthermore, since a labyrinth seal is provided axially on one side and a magnetic seal on the other side, the height dimension of the wiring of the stator of the motor can be increased to some extent, and the spindle motor's consumption of power can be reduced.

What is claimed is:

1. A magnetic disk drive comprising:
   a housing having a base and a cover and defining a sealed chamber therein;
   a flange fixed to said base;
   a spindle shaft fixed to said housing and said flange;
   a spindle hub rotatably mounted on said spindle shaft within said sealed chamber;
   at least one magnetic disk mounted on said spindle hub in a portion of said sealed chamber;
   means for rotating said spindle hub around said spindle shaft, said means for rotating including a stator having a wiring at a predetermined height dimension;
   first and second bearing means within said sealed chamber for rotatably supporting said spindle hub about said spindle shaft;
   a labyrinth seal located outside of said first bearing means and adapted to prevent entry of contaminated particles from said first bearing means into said portion of said sealed chamber, said labyrinth seal being defined between said flange and an element coupled to said spindle hub; and
   magnetic seal means capable of hydraulically contacting said spindle shaft for preventing the entry of contaminated particles from said second bearing means into said portion of said sealed chamber, said seal means being disposed between said spindle hub and said spindle shaft,
   said magnetic seal means including an annular magnet fixed to said spindle hub, a pair of magnetic plates, one end of said magnetic plates being fixed to said spindle hub in such a manner as to sandwich said annular magnet, the other ends of said magnetic plate being allowed to project from said annular magnet toward said spindle shaft, wherein said other ends of said magnetic plates are spaced apart from said spindle shaft to form a cavity, and a magnetic fluid having magnetic particles dispersed within said cavity.

2. A magnetic disk drive according to claim 1, wherein said element coupled to said spindle hub further comprises a bushing.

3. A magnetic disk drive according to claim 2, wherein said labyrinth seal is defined by an annular groove formed in said bushing and an annular projection fitted into said annular groove, said annular projection being integrally formed with said flange, and wherein a gap formed between said annular groove and said annular projection is small in the radial direction but large in the axial direction.

4. A magnetic disk drive according to claim 2, further comprising an additional labyrinth seal defined between an additional flange fixed to said base and said bushing.

5. A magnetic disk drive comprising:

a housing having a base and a cover and defining a sealed chamber therein;

at least one magnetic disk which rotates in a portion of said sealed chamber;

a spindle motor including a flange fixed to said base, a spindle shaft fixed to said housing and said flange, a stator having a coil at a predetermined height dimension and fixed to said spindle shaft, a rotor having a spindle hub and a magnet, and first and second bearings for rotatably supporting said rotor about said spindle shaft, said spindle motor and said first and second bearings being provided in said sealed chamber;

a labyrinth seal located outside of said first bearing and adapted to prevent entry of contaminated particles from said first bearing into said portion of said sealed chamber, said labyrinth seal being defined between said flange and an element rotating with said rotor; and a magnetic seal for preventing entry of contaminated particles from said second bearing into said portion of said sealed chamber, said magnetic seal being disposed between said rotor and said spindle shaft at a position outside of said second bearing, said labyrinth seal and said magnetic seal sandwiching said first and second bearings and effectively sealing said first and second bearings from said portion of said sealed chamber which contains said magnetic disk.

6. A magnetic disk drive according to claim 5, wherein said element rotating with said rotor is a bushing fixed to said spindle hub of said rotor.

7. A magnetic disk drive according to claim 6, wherein said labyrinth seal is defined by an annular groove formed in said bushing and an annular projection fitted into said annular groove, said annular projection being integrally formed with said flange, and wherein a gap formed between said annular groove and said annular projection is small in the radial direction but large in the axial direction.

8. A magnetic disk drive according to claim 6, further comprising an additional labyrinth seal defined between an additional flange fixed to said base and said bushing.

9. A magnetic disk drive comprising:

a housing having a base and a cover and defining a sealed chamber therein;

at least one magnetic disk which rotates in a portion of said sealed chamber;

a spindle motor including a flange, a spindle shaft fixed to said flange, a stator having a coil at a predetermined height dimension and fixed to said spindle shaft, a rotor having a spindle hub and a magnet, and first and second bearings for rotatably supporting said rotor about said spindle shaft, said spindle motor and said first and second bearings being provided in said sealed chamber;

a labyrinth seal located outside of said first bearing and adapted to prevent entry of contaminated particles from said first bearing into said portion of said sealed chamber, said labyrinth seal being defined between said flange and an element rotating with said rotor; and a magnetic seal for preventing entry of contaminated particles from said second bearing into said portion of said sealed chamber, said magnetic seal being disposed between said rotor and said spindle shaft at a position outside of said second bearing, said labyrinth seal and said magnetic seal sandwiching said first and second bearings and effectively sealing said first and second bearings from said portion of said sealed chamber which contains said magnetic disk.

10. A magnetic disk drive according to claim 9, wherein said flange is fixed to said base.

* * * * *

UNITED STATES PATENT AND TRADEMARK OFFICE
CERTIFICATE OF CORRECTION

PATENT NO. : 5,600,514
DATED : February 4, 1997
INVENTOR(S) : Fukuzawa

It is certified that error appears in the above-indentified patent and that said Letters Patent is hereby corrected as shown below:

Column 1, line 17, delete "of".

Column 1, line 20, delete "in increase" and insert --in an increase-- therefor.

Column 1, line 27, delete "disk, the" and insert --disk, due to the-- therefor.

Column 1, line 53, delete "from" and insert --from the--.

Column 2, line 17, delete "crush" and insert --crash-- therefor.

Column 2, line 25, delete "therefor" and insert --from-- therefor.

Column 4, line 32, delete "narrower" and insert --narrow-- therefor.

UNITED STATES PATENT AND TRADEMARK OFFICE
CERTIFICATE OF CORRECTION

PATENT NO. : 5,600,514
DATED : February 4, 1997
INVENTOR(S) : Fukuzawa

It is certified that error appears in the above-identified patent and that said Letters Patent is hereby corrected as shown below:

Column 5, line 15, delete "top" and insert --the top--.

Signed and Sealed this

Second Day of June, 1998

Attest:

BRUCE LEHMAN

Attesting Officer

Commissioner of Patents and Trademarks